(12) United States Patent
Kudo et al.

(10) Patent No.: US 12,039,761 B2
(45) Date of Patent: Jul. 16, 2024

(54) IMAGE PROCESSING METHOD, AND SPECTRAL CAMERA SYSTEM

(71) Applicant: SEIKO EPSON CORPORATION

(72) Inventors: Kei Kudo, Shiojiri (JP); Teruyuki Nishimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 90 days.

(21) Appl. No.: 18/050,720

(22) Filed: Oct. 28, 2022

(65) Prior Publication Data
US 2023/0137388 A1 May 4, 2023

(30) Foreign Application Priority Data
Oct. 29, 2021 (JP) .................................. 2021-178048

(51) Int. Cl.
*G06T 7/90* (2017.01)
*G01J 3/28* (2006.01)
*H04N 23/84* (2023.01)

(52) U.S. Cl.
CPC .............. *G06T 7/90* (2017.01); *G01J 3/2823* (2013.01); *H04N 23/84* (2023.01); *G01J 2003/283* (2013.01); *G06T 2207/10024* (2013.01)

(58) Field of Classification Search
CPC ............. G06T 7/90; G06T 2207/10024; G01J 3/2823; G01J 2003/283; G01J 2003/2826; H04N 23/84; H04N 23/85; G02B 27/1006
See application file for complete search history.

(56) References Cited

U.S. PATENT DOCUMENTS

| | | | |
|---|---|---|---|
| 8,063,976 B2* | 11/2011 | Kita | G02B 5/284 348/231.6 |
| 2009/0027518 A1 | 1/2009 | Kita | |
| 2013/0141611 A1* | 6/2013 | Hirai | H04N 1/6033 348/E9.002 |
| 2018/0107015 A1* | 4/2018 | Dümpelmann | G02B 5/008 |

FOREIGN PATENT DOCUMENTS

| | | | | |
|---|---|---|---|---|
| JP | 2009033222 A | | 2/2009 | |
| JP | 5082648 B2 * | | 11/2012 | G02B 5/284 |

* cited by examiner

*Primary Examiner* — Nhan T Tran
(74) *Attorney, Agent, or Firm* — CHIP LAW GROUP

(57) ABSTRACT

An image processing method of converting spectral image data of a plurality of spectral wavelengths imaged by a spectral camera into a color image by using a processor, wherein the processor acquires a plurality of pieces of the spectral image data from a storage unit, calculates a correction value by multiplying a optical spectrum of each pixel of a corresponding one of the plurality of spectral image data by a correction constant set for each wavelength, calculates a color conversion value by summing the correction values of the same pixel positions, and generates a color composite image based on the color conversion value. Then, the correction constant is set such that a sum spectrum obtained by summing characteristic spectra obtained by multiplying a sensitivity characteristic with respect to each spectral wavelength of the spectral camera by the correction constant corresponding to each wavelength matches a target spectrum of any color filter.

7 Claims, 7 Drawing Sheets

IMAGE PROCESSING METHOD, AND SPECTRAL CAMERA SYSTEM

The present application is based on, and claims priority from JP Application Serial Number 2021-178048, filed Oct. 29, 2021, the disclosure of which is hereby incorporated by reference herein in its entirety.

BACKGROUND

1. Technical Field

The present disclosure relates to an image processing method of processing a spectral image, and a spectral camera system.

2. Related Art

Conventionally, an image processing apparatus is known in which an imaging target is imaged using a spectral camera, each spectral image with respect to a corresponding one of a plurality of wavelengths is acquired, and a color image of the imaging target is generated based on these spectral images (for example, see JP-A-2009-33222).

The image processing apparatus described in JP-A-2009-33222 acquires spectral image data of the plurality of wavelengths with respect to the imaging target, and corrects transmittance and sensitivity of the spectral image data for each wavelength band λi. Then, a luminance value of each pixel of the spectral image data is multiplied by a pseudo color conversion function r'(λi), g'(λi) and b'(λi) or a color matching function r(λi), g(λi) and b(λi) to obtain tristimulus values R, G and B. In other words, the R, G, and B values are calculated by applying any color filter (r filter, g filter, b filter, or the like) to the luminance value of each pixel. Then, the R, G, and B values of each pixel of the spectral image data of each wavelength band are integrated for each pixel to calculate the R, G, and B data of each pixel, and an color composite image is generated based on the calculated R, G, and B data.

In the image processing apparatus described in JP-A-2009-33222, the same pseudo color conversion function or the same color matching function as a correction coefficient is integrated into the luminance value regardless of a characteristic of the spectral camera, that is, spectral performance at a predetermined wavelength when an image of the predetermined wavelength is imaged by the spectral camera. This means that the luminance value of the camera is merely multiplied by a filter function of any color filter.

In such a configuration, when resolution of the spectral element incorporated into the spectral camera is high, and a desired wavelength can be transmitted with a narrow half-width, the color composite image having a high color reproducibility with respect to the imaging target can be generated. However, there is a problem that the lower the wavelength resolution due to increase of the half-width of the spectral element, the greater the errors, and thus the color reproducibility in the color composite image is reduced.

In other words, in a known image processing method as described in JP-A-2009-33222, there is a problem that the color reproducibility of the color composite image is influenced by the characteristic of the spectral camera.

SUMMARY

An image processing method according to a first aspect of the present disclosure is an image processing method of converting spectral image data of a plurality of spectral wavelengths imaged by a spectral camera into a color image by using one or more processors, and is configured to cause the one or more processors to execute acquiring, from a storage unit, a data cube including optical spectra based on luminance values of the same pixel positions in a plurality of pieces of the spectral image data corresponding respectively to the plurality of spectral wavelengths, calculating a correction value by multiplying the optical spectrum of each pixel by a correction constant set for each wavelength, and calculating a color conversion value by summing the correction values at the same pixel positions in the plurality of spectral image data to generate a color composite image based on the color conversion value of each pixel, wherein when a spectrum obtained by multiplying a sensitivity characteristic spectrum with respect to the spectral wavelength in the spectral camera by the correction constant corresponding to each wavelength is set as a characteristic spectrum, and a spectrum obtained by summing characteristic spectra respectively corresponding to the plurality of spectral wavelengths is set as a sum spectrum, the correction constant is set so that the sum spectrum matches a target spectrum which is a spectrum of any color filter.

The image processing method of the present aspect, is configured to cause the one or more processors to further perform acquiring the sensitivity characteristic spectra with respect to the plurality of spectral wavelengths in the spectral camera, acquiring the target spectrum, and calculating the correction constant corresponding to each wavelength so that the sum spectrum matches the target spectrum.

In the image processing method of the present aspect, the correction constant $a_i$ is a value that minimizes $\Sigma(\{\Sigma a_i S_i(\lambda)\} - F(\lambda))^2$, where $F(\lambda)$ is the target spectrum, $a_i$ is the correction constant with respect to a wavelength $\lambda_i$, and $S_i(\lambda)$ is a sensitivity characteristic when the spectral image data of a spectral wavelength $\Lambda_i$ is imaged by the spectral camera.

A spectral camera system of a second aspect of the present disclosure includes a spectral camera for separating light centered on a predetermined spectral wavelength from incident light and image the separated light and being capable of changing the spectral wavelength to a plurality of wavelengths, a storage unit for storing spectral image data imaged by the spectral camera, a data acquisition unit for acquiring, from the storage unit, a data cube including optical spectra based on luminance values at the same pixel positions in a plurality of pieces of the spectral image data corresponding respectively to the plurality of spectral wavelengths, a correction value calculation unit for calculating a correction value by multiplying the optical spectrum of each pixel by a correction constant set for each wavelength, and an image composition unit for calculating a color conversion value by summing the correction values at the same pixel positions in the plurality of spectral image data, and generating a color composite image based on the color conversion value of each pixel, wherein when a spectrum obtained by multiplying a sensitivity characteristic spectrum with respect to the spectral wavelength in the spectral camera by the correction constant corresponding to each wavelength is set as a characteristic spectrum, and a spectrum obtained by summing characteristic spectra respectively corresponding to the plurality of spectral wavelengths is set as a sum spectrum, the correction constant is set so that the sum spectrum matches a target spectrum which is a spectrum of any color filter.

In the spectral camera system of the present aspect, the correction constant is recorded in advance in the storage unit.

In the spectral camera system of the present embodiment, the sensitivity characteristic spectra of a plurality of the spectral cameras each having a different sensitivity characteristic spectrum and the correction constant with respect to each sensitivity characteristic spectrum are stored in advance in the storage unit, a camera characteristic acquisition unit for acquiring the sensitivity characteristic spectrum of the spectral camera is further included, and the correction value calculation unit reads out the correction constant corresponding to the acquired sensitivity characteristic spectrum from the storage unit to calculate the correction value.

The spectral camera system of the present embodiment further includes a camera characteristic acquisition unit for acquiring the sensitivity characteristic spectra with respect to the plurality of spectral wavelengths in the spectral camera, and a constant calculation unit for calculating the correction constant corresponding to each wavelength so that the sum spectrum matches the target spectrum.

DESCRIPTION OF EXEMPLARY EMBODIMENTS

First Embodiment

A spectral camera system of a first embodiment according to a present disclosure will be described below.

Figure 1:
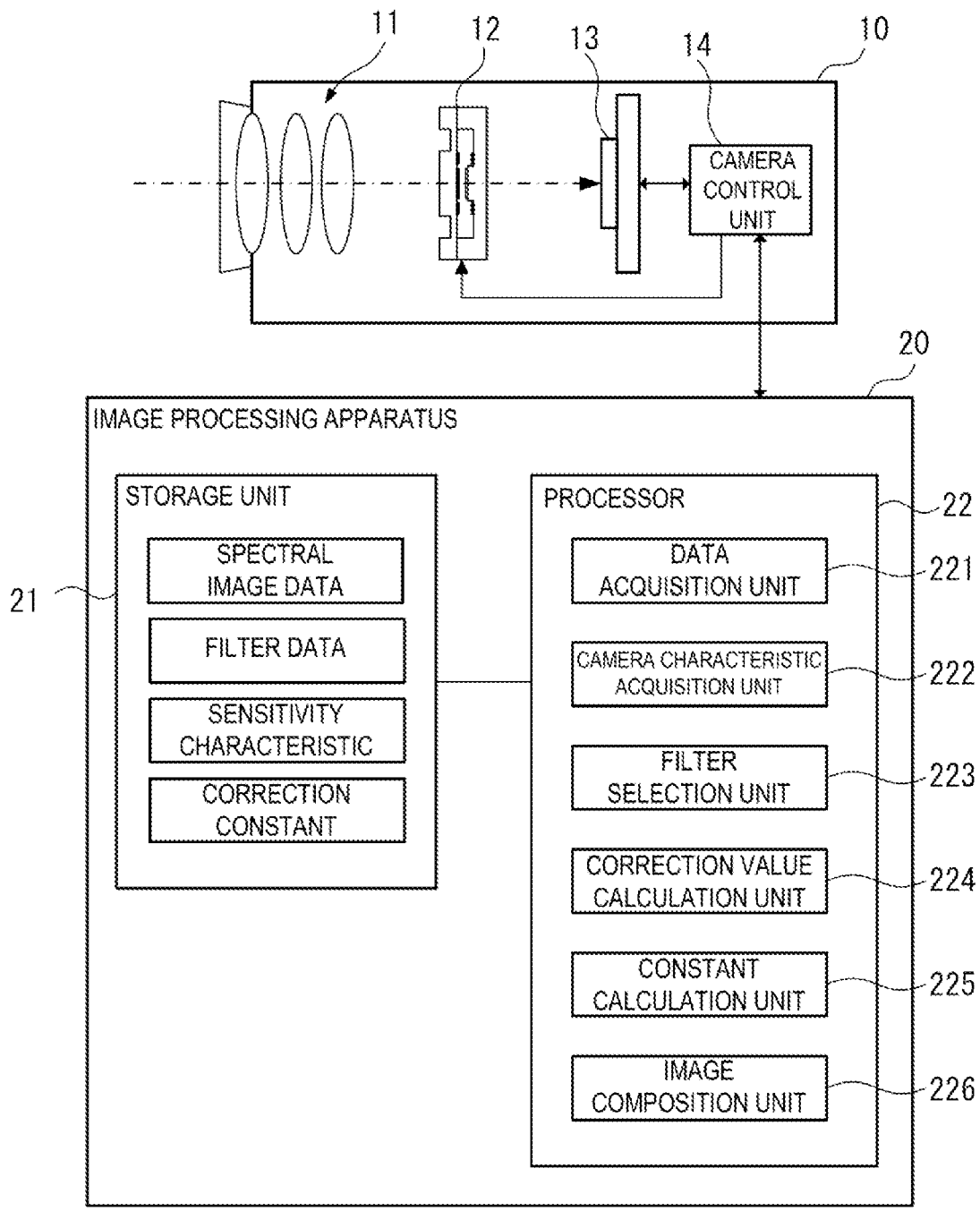
FIG. 1 is schematic diagram illustrating a schematic configuration of a spectral camera system according to a first embodiment.

FIG. 1 is a schematic diagram illustrating a schematic configuration of the spectral camera system.

As illustrated in FIG. 1, the spectral camera system of the present embodiment includes a spectral camera 10 for imaging a spectral image of an imaging target, and an image processing apparatus 20 for receiving spectral image data of the spectral image imaged by the spectral camera 10.

In addition, the spectral camera system may be also provided with an optical element (illumination unit) for irradiating the imaging target with light.

In the spectral camera system of the present embodiment, the image processing apparatus 20 combines spectral images of a plurality of spectral wavelengths imaged by the spectral camera 10 to generate a color image.

Hereinafter, each configuration of such a spectral camera system will be described.

Configuration of Spectral Camera 10

As illustrated in FIG. 1, the spectral camera 10 includes an optical lens system 11, a spectral element 12, an imaging element 13, a camera control unit 14 and the like.

The optical lens system 11 includes, for example, a plurality of lenses for guiding incident light reflected by the imaging target and incident on the spectral camera 10 to the spectral element 12 and the imaging element 13. Note that although FIG. 1 illustrates the plurality of lenses constituting an incident optical system as the optical lens system 11, one or more lenses constituting an imaging optical system may be also provided between the spectral element 12 and the imaging element 13, for example, and in addition, various lenses constituting a telecentric optical system may be provided.

The spectral element 12 receives the incident light guided by the optical lens system 11, and transmits light centered on a predetermined spectral wavelength. Note that, in the present embodiment, an example is illustrated in which light centered on a desired spectral wavelength is transmitted toward the imaging element 13 by the spectral element 12, but a configuration may be employed in which light of the desired spectral wavelength is reflected toward the imaging device 13.

The spectral element 12 is an element capable of switching the spectral wavelength of the light transmitted toward the imaging element 13, and for example, a wavelength variable type Fabry-Perot etalon or the like can be used. The Fabry-Perot etalon is an element in which a pair of mirrors are disposed to face each other, and incident light is multiple reflected between the mirrors, and light having the predetermined spectral wavelength intensified by interference is transmitted. In such a Fabry-Perot etalon, the spectral wavelength can be switched by, for example, changing a gap between the mirrors by an actuator element such as an electrostatic actuator.

Note that the spectral element 12 is not limited to the Fabry-Perot etalon as described above, and for example, an Acousto-Optic Tunable Filter (AOTF), a Liquid Crystal Tunable Filter (LCTF), or the like may be used.

The imaging element 13 receives light centered on the desired spectral wavelength separated by the spectral element 12, and images the spectral image. As the imaging element 13, a general image sensor such as a Charge-Coupled Device (CCD), a Complementary Metal-Oxide Semiconductor (CMOS), and the like can be used.

The camera control unit 14 includes, for example, a spectral control circuit for controlling the spectral element 12, an imaging control circuit for controlling the imaging element 13, a microcomputer configured for controlling the overall operation of the spectral camera 10, and a camera memory for storing various data.

The spectral control circuit outputs a predetermined drive signal to the spectral element 12 to switch the spectral wavelength to be separated by the spectral element 12 under the control of the microcomputer.

The imaging control circuit drives the imaging element 13 to output the image signal corresponding to the light receiving amount of each pixel to the microcomputer under the control of the microcomputer.

The microcomputer switches the spectral wavelength at the spectral element 12 by controlling the spectral control circuit, and acquires the image signal from the imaging element 13 by controlling the imaging control circuit. Then, the spectral image data is generated based on the image signal input from the imaging element 13.

The camera memory records various types of data for controlling the spectral element 12 and the like.

In addition, the camera memory may record the sensitivity characteristic spectrum (hereinafter, simply referred to as sensitivity characteristic) in the spectral camera 10. The sensitivity characteristic in the spectral camera 10 is spectrum data indicating a sensitivity with respect to each wavelength when a spectral image with respect to the predetermined spectral wavelength is imaged by the spectral camera 10. The sensitivity characteristic is a value obtained by multiplying an optical lens characteristic of the optical lens system 11, a spectral characteristic of the spectral element 12, and an image sensitivity characteristic of the imaging element 13. Note that, as the spectral camera system, when the imaging target is irradiated with illumination light, and the reflected light of the illumination light is imaged, the sensitivity characteristic is a value obtained by multiplying the optical lens characteristic of the optical lens system 11, the spectral characteristic of the spectral element 12, the imaging sensitivity characteristic of the imaging element 13, and the spectrum (emission spectrum) of the illumination light.

Here, the optical characteristic of the optical lens system 11 is transmittance for each wavelength of light transmitted through the optical lens system 11.

Further, the spectral characteristic of the spectral element 12 is the transmittance with respect to each wavelength when light having the spectral wavelength $\Lambda$ is to be transmitted by the spectral element 12. In the present embodiment, the spectral element 12 can switch a plurality of the spectral wavelengths $\Lambda$. That is, assuming that the number of switchable spectral wavelengths $\Lambda$ is K, the spectral element 12 can select K wavelengths from a spectral wavelength $\Lambda_i$ to a spectral wavelength $\Lambda_K$. Thus, the spectral element 12 has K spectral characteristics in accordance with each spectral wavelength $\Lambda_i$.

The imaging sensitivity characteristic of the imaging element 13 indicates sensitivity of the imaging element 13 with respect to each wavelength.

Configuration of Image Processing Apparatus 20

The image processing apparatus 20 may be constituted by, for example, a smartphone, a tablet terminal, a typical computer such as a personal computer and, as illustrated in FIG. 1, includes a storage unit 21 and at least one or more processors 22.

The storage unit 21 is an information storage device including a memory, a hard disk, or the like.

Examples of information stored in the storage unit 21 include various programs including an image processing program for performing image processing by the image processing apparatus 20 and various data used when the image processing program and other various programs are executed.

Examples of various data include, for example, spectral image data, filter data, sensitivity characteristic of the spectral camera 10, and correction constants.

The spectral image data is image data of the spectral image imaged by the spectral camera 10. In the present embodiment, the spectral wavelength is switched, and each spectral image with respect to a corresponding one of the plurality of spectral wavelengths is imaged with respect to the imaging target. Thus, the spectral image data of the plurality of spectral wavelengths with respect to the same imaging target are recorded in association with each other by image IDs or the like.

As described above, the sensitivity characteristic of the spectral camera 10 is the spectral data obtained by multiplying the optical lens characteristic of the optical lens system 11, the spectral characteristic of the spectral element 12, and the imaging sensitivity characteristic of the imaging element 13. When one spectral camera 10 is used in the spectral camera system, the sensitivity characteristic of only the spectral camera 10 need be recorded. Additionally, in the spectral camera system, when the spectral camera 10 is detachable and any spectral camera 10 can be selected, the sensitivity characteristic of each spectral camera 10 may be recorded.

The spectral data of the color filter, which is a target when the color composite image is formed from the optical spectrum, is recorded in the filter data. The filter data is used for calculating the correction constant. For example, when RGB color image similar to the case where the imaging target is imaged by using the RGB color filter is generated from the optical spectrum, a correction constant for converting the optical spectrum into each color conversion value of R, G, and B is required. In this case, as the filter data used for calculating the correction constant, a transmittance spectrum of an R color filter, a transmission spectrum of a G color filter, and a transmittance spectrum of a B color filter are recorded in the storage unit 21.

Note that a plurality of filter data respectively corresponding to each of a plurality of the color systems may be recorded. For example, a color filter of an RGB color system, an color filter of an XYZ color system, and a color filter of an Lab color system may be recorded. In this case, a user can also select a desired color system.

The correction constant is a constant used for calculating the correction value. As described above, in the present embodiment, the optical spectrum is converted into the color conversion value corresponding to any color filter, and the images similar to the case where the imaging target is imaged by using any color filter is generated as the color composite image. Thus, the correction constant is set for each color filter and each wavelength.

For example, when the color composite image is generated so as to be a color image using the RGB color filter, a correction constant for each wavelength corresponding to the R filter, a correction constant for each wavelength corresponding to the G filter, and a correction constant for each wavelength corresponding to the B filter are recorded.

Additionally, the sensitivity characteristic of the spectral camera 10 incorporated into the spectral camera system may be recorded in the storage unit 21.

The processor 22 reads and executes the program stored in the storage unit 21, and thus functions as a data acquisition unit 221, a camera characteristic acquisition unit 222, a filter selection unit 223, a constant calculation unit 225, a correction value calculation unit 224, and an image composition unit 226.

The data acquisition unit 221 acquires, from the storage unit 21, a data cube including optical spectra based on luminance values at the same pixel positions in the plurality of spectral image data corresponding respectively to the plurality of spectral wavelengths. That is, the data acquisition unit 221 acquires data including the pixel positions, the spectral wavelengths, and the luminance values respectively with respect to a corresponding one of the spectral wavelengths at a corresponding one of the pixel positions. Specifically, the data acquisition unit 221 may acquire the respective spectral image data corresponding to each of the plurality of spectral wavelengths, and may acquire a luminance value of each pixel (x, y) of each of the spectral image data, or may acquire a change in luminance value of a line region along an X direction for each position in a Y direction. In either case, the luminance value (optical spectrum) of each wavelength with respect to the same pixel can be obtained.

The camera characteristic acquisition unit 222 acquires the sensitivity characteristic of the spectral camera 10. The camera characteristic acquisition unit 222 may acquire the sensitivity characteristic stored in the camera memory of the spectral camera 10, or may acquire the sensitivity characteristic input by the user.

The filter selection unit 223 selects the color filter when the color composite image is generated from the plurality of spectral image data. In addition, when the correction constant is calculated, the color filter to be the target is selected.

Note that, in the present embodiment, a configuration is illustrated in which any color filter can be selected by the user, but when a color filter of the single color system is used, the filter selection unit 223 may be omitted.

The constant calculation unit 225 calculates the correction constant and stores, in the storage unit 21, the correction constant.

Although details will be described later, in the present embodiment, the constant calculation unit 225 calculates the correction constant by using, for example, the sensitivity characteristic of the spectral camera 10 and any filter data.

The correction value calculation unit 224 reads out, from the storage unit 21, the correction constant corresponding to the sensitivity characteristic of the spectral camera 10 and corresponding to the color filter of the color system to be the target. Then, the correction value calculation unit 224 calculates the correction values each obtained by correcting a signal value of each pixel of the plurality of spectral image data with respect to the imaging target by the corresponding correction constant.

The image composition unit 226 calculates the color conversion value obtained by summing the correction values calculated by the correction value calculation unit 224 to generate the color composite image.

Image Processing Method

Next, an image processing method of generating the color composite image in the spectral camera system of the present embodiment will be described.

Calculation of Correction Constant

In the spectral camera system of the present embodiment, the correction constants are recorded in advance in the storage unit 21. In the present embodiment, the image processing apparatus 20 can calculate these correction constants, and the method of calculating the correction constants will be described below.

Figure 2:
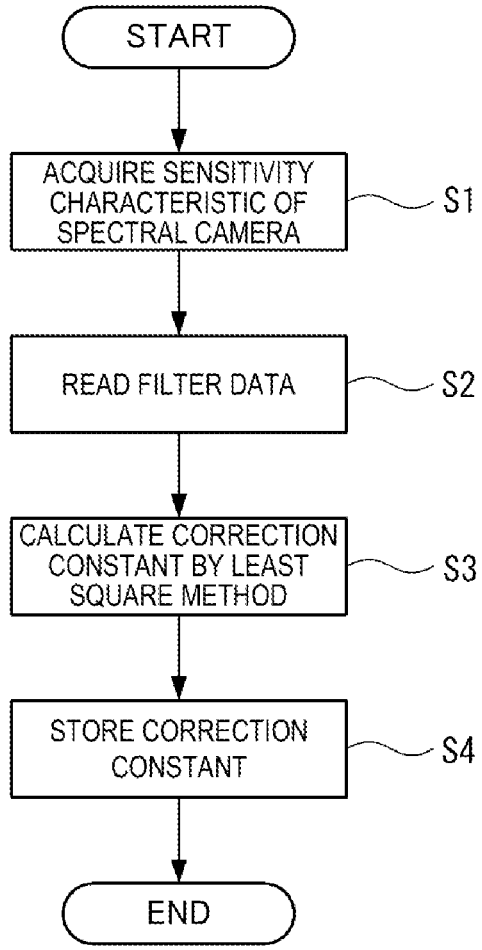
FIG. 2 is a flowchart illustrating a method of calculating a correction constant according to the first embodiment.
Figure 3:
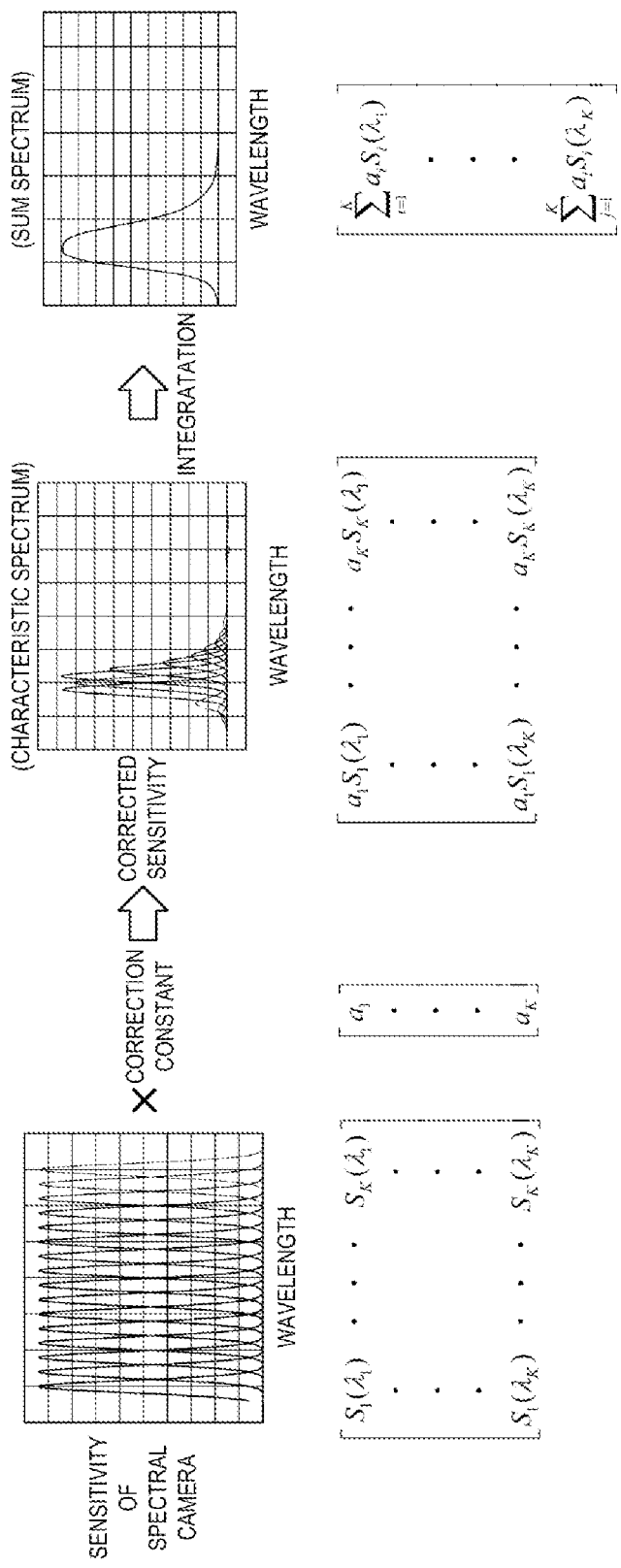
FIG. 3 is an image diagram illustrating an example of the method of calculating the correction constant according to the first embodiment.

FIG. 2 is a flowchart illustrating the method of calculating the correction constant. FIG. 3 is an image diagram illustrating an example of the method of calculating the correction constant.

First, the camera characteristic acquisition unit 222 of the image processing apparatus 20 acquires the sensitivity characteristic of the spectral camera 10 incorporated into the spectral camera system (step S1).

For example, with respect to the sensitivity characteristic of the spectroscopic camera 10, when the sensitivity characteristic is recorded in the camera memory of the camera control unit 14 of the spectroscopic camera 10 or the storage unit 21 as described above, the sensitivity characteristic may be read.

The sensitivity characteristic of the spectral camera 10 is typically measured at the time of manufacturing the spectral camera 10.

For example, the spectral element 12 is set to a predetermined spectral wavelength $\Lambda_i$, and a single wavelength laser light is incident on the spectral element 12, and the light intensity of the transmitted light is measured. By sequentially changing the wavelength $\lambda$ of the laser light in the wavelength range of the spectral image imaged by the spectral camera 10 and measuring the light intensity of the transmitted light, the spectral characteristic of each wavelength $\lambda$ when the spectral element 12 is set to the spectral wavelength $\Lambda_i$ can be obtained. By performing this operation while sequentially switching to the spectral wavelengths $\Lambda_i$ (i=1 to K of an integer) switchable by the spectral element 12, the respective spectral characteristics when the spectral element 12 is set to each spectral wavelength $\Lambda_i$ can be obtained.

With respect to the optical lens characteristic of the optical lens system 11, for example, the single wavelength laser light is incident on the optical lens system 11 to measure the light intensity of the transmitted light of the single wavelength laser light. By sequentially changing the wavelength of the laser light in the wavelength range of the spectral image imaged by the spectral camera 10 and measuring the light intensity of the transmitted light, the optical lens characteristic of the optical lens system 11 can be obtained.

Similarly, with respect to the imaging sensitivity characteristic of the imaging element 13, for example, the single wavelength laser light is received by the imaging element 13, and received light intensity (received light signal to be output) of the received light is measured. By sequentially changing the wavelength of the laser light in the wavelength range of the spectral image imaged by the spectral camera 10 and measuring the received light signal, the imaging sensitivity characteristic of the imaging element 13 can be obtained. Note that the imaging sensitivity characteristic of the imaging element 13 can be measured for each pixel.

Then, the sensitivity characteristic of the spectral camera 10 is obtained by multiplying these spectral characteristic of the spectral element 12, the optical lens characteristic of the optical lens system 11, and the imaging sensitivity characteristic of the imaging element 13. Thus, as illustrated in FIG. 3, the sensitivity characteristics of the spectral camera 10 have different spectral data from each other for each spectral wavelength $\lambda_i$ set at the spectral element 12, and these sensitivity characteristics are set for each pixel of the imaging element 13.

Hereinafter, the sensitivity characteristic when the spectral element 12 is set to the spectral wavelength $\Lambda_i$ is indicated as $S_i(\lambda)$. i is a suffix indicating the spectral wavelength switchable by the spectral element 12, and when the switchable switching number is K, i is an integer from 1 to K.

In addition, each spectrum of the spectral characteristic of the spectral element 12, the optical lens characteristic of the optical lens system 11, and the image sensitivity characteristic of the imaging element 13 has K elements from wavelengths $\lambda_1$ to $\lambda_K$. Thus, the sensitivity characteristic $S_i(\lambda)$ can be indicated by a matrix of K rows and K columns as illustrated in FIG. 3.

Note that the spectral wavelength $\Lambda_i$ and the wavelength $\lambda_i$ are preferably $\Lambda_i = \lambda_i$.

Next, the filter selection unit 223 selects the color filter used when the color composite image is generated, and reads, from the storage unit 21, the filter data of the color filter (step S2). The filter data read here is the target spectrum.

When the color filter to be used is set in advance, filter data of the set color filter may be read. For example, where the RGB color composite image is generated, the filter data of the R color filter, the filter data of the G color filter, and the filter data of the B color filter of the RGB color system are read.

Further, when color filters corresponding to the plurality of color systems are recorded in the storage unit 21, a color system specified by the user's operation may be selected, and the filter data of the color system may be read.

Note that, in the present embodiment, an example is illustrated in which the filter data corresponding to one color system is read, but the filter data of the plurality of color systems may be read. For example, the filter data corresponding to the RGB color system and the filter data corresponding to the Lab color system may be read.

Figure 4:
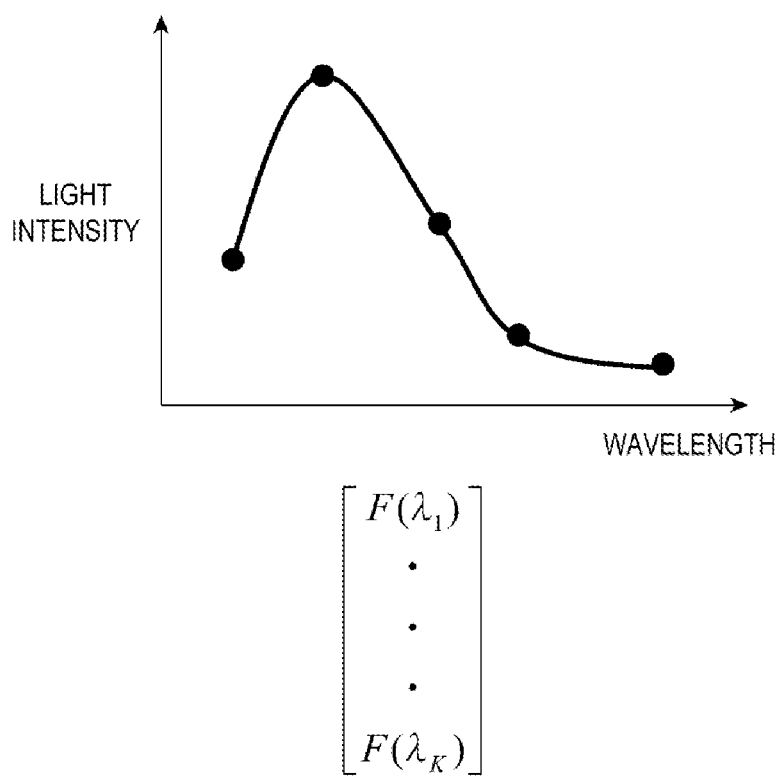
FIG. 4 is a diagram illustrating an example of filter data.

FIG. 4 is an example of the filter data, and illustrating the filter data for the B color filter in the RGB color filter. As illustrated in FIG. 4, the filter data is a spectrum data indicating a relationship between the wavelength of light transmitted through the filter and the light intensity of the transmitted light, and can be indicated by a matrix of K rows and one column including K elements from the wavelengths $\lambda_1$ to $\lambda_K$.

Thereafter, the constant calculation unit 225 calculates the correction constant (step S3).

In step S3, as illustrated in FIG. 3, the constant calculation unit 225 calculates a correction constant such that a sum spectrum obtained by summing the characteristic spectra of the plurality of spectral wavelengths $\Lambda_i$ matches or substantially matches the filter data (see FIG. 4) obtained in step S2 while a spectrum obtained by multiplying the sensitivity characteristic of the spectral camera 10 obtained in step $S_i$ by the correction constant is set as a characteristic spectrum.

For example, the constant calculation unit 225 calculates, by using the least square method, the correction constant $a_i$ with respect to the wavelength $\lambda_i$ so that $\Sigma(\{\Sigma a_i S_i(\lambda)\} - F(\lambda))^2$ is minimum.

More specifically, as described above, the sensitivity characteristics $S_i(\lambda)$ of K spectral wavelengths $\Lambda_i$ each includes an element $S_i(\lambda)$ corresponding to each of K wavelengths $\lambda_1$, and filter data $F(\lambda)$ includes an element $F(\lambda_j)$ corresponding to each of the K wavelengths $\lambda_j$. Thus, the constant calculation unit 225 calculates the correction constant $a_i$ in which X represented in Equation (1) below is a minimum value.

[Mathematical Equation 1]

$$X = \sum_{j=1}^{K}\left[\left\{\sum_{i=1}^{K}a_i S_i(\lambda_j)\right\} - F(\lambda_j)\right]^2 \quad (1)$$

Thereafter, the constant calculating unit 225 stores, in the storage unit 21, the calculated correction constant $a_i$ as appropriate (step S4). In the present embodiment, since the sensitivity characteristic of the spectral camera 10 is set for each pixel, the correction constant $a_i$ can also be calculated for each pixel.

According to the above, the correction constant $a_i$ corresponding to the color filter of the color system selected in step S2 is calculated. For example, the correction constant $a_i$ with respect to each wavelength $\lambda_i$ for the R color filter, the correction constant $a_i$ with respect to each wavelength $\lambda_i$ for the G color filter, the correction constant $a_i$ with respect to each wavelength $\lambda_i$ for the B color filter, are calculated as the correction constants for the color composite image of the RGB color system.

Note that in step S2, the filter data of the plurality of color systems may be selected as described above, and in this case, the processings of step S3 and step S4 may be performed for each color filter.

Generation of Color Composite Image

Next, a method of generating the color composite image from the plurality of spectral image data with respect to the imaging target imaged by the spectral camera 10 will be described.

Figure 5:
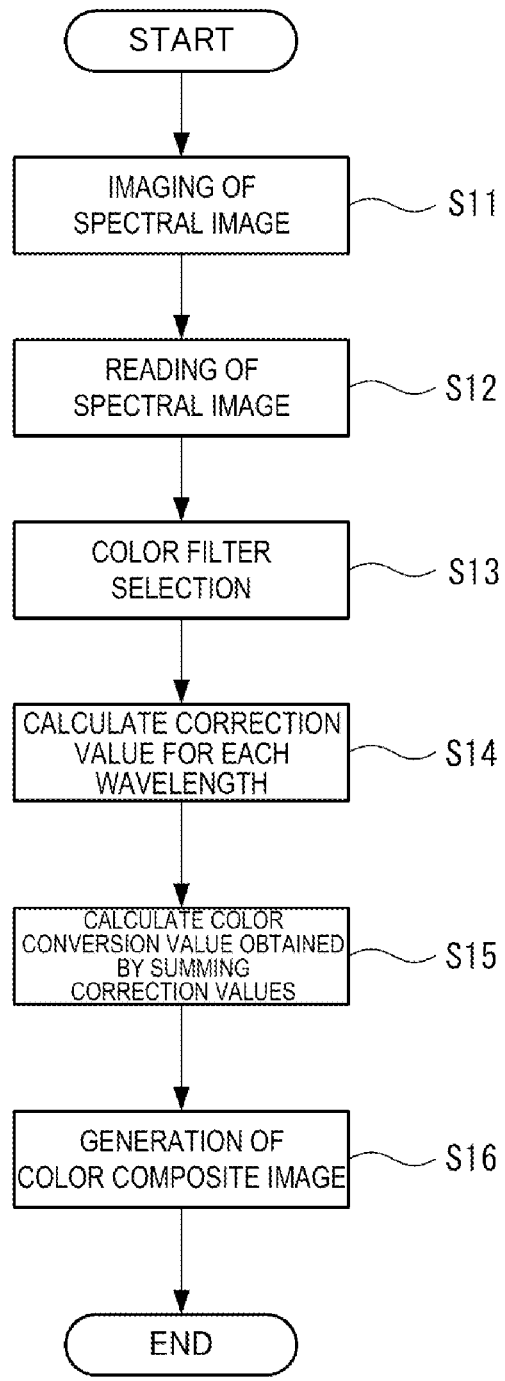
FIG. 5 is a flowchart illustrating a method of generating a color composite image according to the first embodiment.
Figure 6:
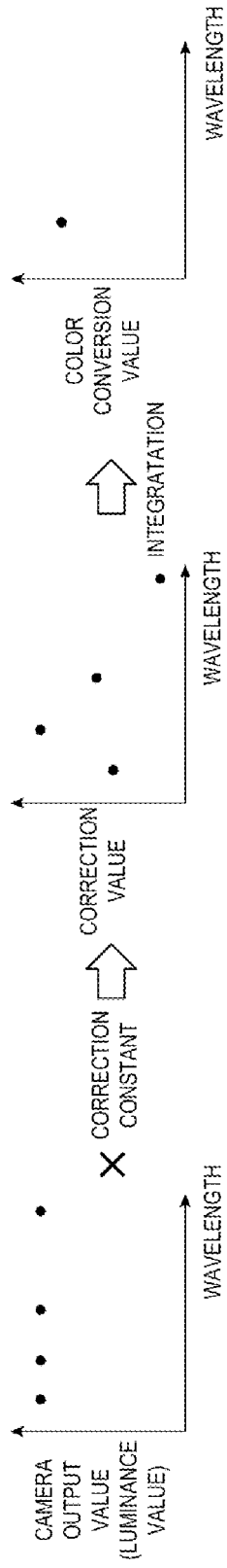
FIG. 6 is an image diagram illustrating an example of the method of generating the color composite image.

FIG. 5 is a flowchart illustrating the method of generating the color composite image. FIG. 6 is an image diagram illustrating an example of the method of generating the color composite image.

When the operation of instructing the imaging of the spectral image is performed by the user, the spectral camera 10 images the imaging target at each spectral wavelength $\Lambda_i$ while sequentially switching the spectral wavelength $\Lambda_i$ of the spectral element 12 (step S11).

For example, the wavelength data and the imaging ID are associated with each spectral image data obtained by imaging. The wavelength data is a data indicating the spectral wavelength $\Lambda_i$ of the spectral element 12 when the spectral image data is imaged. In addition, each of the spectral image data of the plurality of spectral wavelengths $\Lambda_i$ obtained by one imaging process is denoted by the same imaging ID.

The spectral image data imaged by the spectral camera 10 is transmitted to the image processing apparatus 20, and is stored as appropriate in the storage unit 21 of the image processing apparatus 20.

Next, the data acquisition unit 221 of the image processing apparatus 20 receives, from the user, an operation of instructing the generation processing of the color composite image, and then acquires, from the storage unit 21, a data cube (for example, spectral image data with respect to the plurality of spectral wavelengths) including the optical spectrum of each pixel (step S12).

For example, the data acquisition unit 221 reads, from the storage unit 21, a plurality of spectral image data provided with the imaging ID specified by the user.

Furthermore, the filter selection unit 223 selects the color filter when the color composite image is combined (step S13). For example, the filter selection unit 223 may notify the user of a color filter that can be selected to prompt the user to perform a selection operation, and may acquire, as a color filter to be used, a color filter selected by the user.

Note that when there is only one color filter that can be used or when the color filter to be used by the user is fixed in advance, the process of step S13 may be skipped.

Then, the correction value calculation unit 224 corrects the optical spectrum of each pixel based on each spectral image data read out in step S12 by the correction constant $a_i$ of the color filter corresponding to the color filter selected in step S13, and calculates the correction value (step S14).

Here, as described above, when $\Lambda_i=\lambda_i$, the correction value $a_iP_i$ can be easily calculated from the luminance value $P_i$ of each pixel of the spectral image data of the spectral wavelength $\Lambda_i$ and the correction constant $a_i$ corresponding to the wavelength $\lambda_i$.

On the other hand, when the spectral wavelength $\Lambda_i$ of the spectral element 12 differs from the wavelength $\lambda_i$, which is an element of the spectrum, the optical spectrum is calculated from the luminance value of each pixel of each spectral image data, and the correction value $a_iP_i$ is calculated by using the luminance value $P_i$ corresponding to the wavelength $\lambda_i$ in the calculated optical spectrum and the correction constant $a_i$ corresponding to the wavelength $\lambda_i$.

For example, when the color composite image of the RGB color system is generated, correction values (R correction value, G correction value, B correction value)=($a_{ri}P_i$, $a_{gi}P_i$, $a_{bi}P_i$) are calculated for each of the K wavelengths $\lambda_i$ by using a correction constant $a_{ri}$ corresponding to the R color filter, a correction constant $a_{gi}$ corresponding to the G color filter, and a correction constant $a_{bi}$ corresponding to the B color filter.

Then, the image composition unit 226 calculates the color conversion value obtained by summing the correction values calculated in step S14 (step S15).

Specifically, as represented in Equation (2) below, the image composition unit 226 calculates a color conversion value C for each pixel by summing the correction value $a_{gi}P_i$ for each color filter.

[Equation 2]

$$C = \sum_{i=1}^{K} a_i P_i \quad (2)$$

As described above, when the correction values (R correction value, G correction value, B correction value) are calculated, an R color conversion value $C_R$, a G color conversion value $C_G$, and a B color conversion value $C_B$ corresponding to R, G, and B, respectively, are calculated for each pixel.

Thereafter, the image composition unit 226 generates, based on the color conversion values, the color composite image in which a parameter of each pixel is set (step S16). For example, in the color composite image of the RGB color system, the RGB color composite image is generated in which the color parameter for each pixel is set as (R, G, B)=($C_R$, $C_G$, $C_B$).

Effect of Present Embodiment

The image processing apparatus 20 of the present embodiment includes one or more processors 22, and the processor 22 reads and executes the program stored in the storage unit 21, and thus functions as the data acquisition unit 221, the correction value calculation unit 224, and the image composition unit 226.

The data acquisition unit 221 acquires, from the storage unit 21, the plurality of spectral image data corresponding respectively to the plurality of spectral wavelengths in step S12. The correction value calculation unit 224 calculates the correction value by multiplying the optical spectrum of each pixel based on the luminance value of each pixel of the plurality of spectral image data by the correction constant $a_i$ set for each wavelength in step S14. The image composition unit 226 calculates the color conversion value by summing the correction values of the same pixel position in the plurality of spectral image data, and generates the color composite image based on the color conversion value of each pixel.

Here, in the present embodiment, the correction constant $a_i$ for each wavelength is set such that the sum spectrum obtained by summing characteristic spectra respectively corresponding to the plurality of spectral wavelengths $\Lambda_i$ matches the target spectrum which is the spectrum of any color filter while the characteristic spectrum is set by multiplying the sensitivity characteristic of the spectral camera and the correction constant $a_i$ corresponding to each wavelength $\lambda_i$.

In such an embodiment, since the correction constant is set so that any color filter is realized based on the sensitivity characteristic of the spectral camera 10, the color reproducibility when the color composite image is generated can be improved.

That is, although it is ideal that the spectral element 12 transmits only the light having the desired spectral wavelength $\Lambda_i$, it is difficult to block all the light having wavelengths other than the spectral wavelength $\Lambda_i$, and even when it is possible, the amount of the light transmitted through the spectral element 12 is extremely small. For this reason, the spectral camera 10 for imaging the spectral image is typically configured to transmit light having a predetermined half-width centered on the spectral wavelength $\Lambda_i$. However, in this case, the half-width differs depending on performance of the spectral camera 10. Thus, when the optical spectrum based on the spectral image data is multiplied by a filter function corresponding to any color filter as in the known case, the generated color reproducibility of the color composite image differs depending on the performance of the spectral camera 10.

In contrast, in the present embodiment, the correction constant corresponding to the sensitivity characteristic of the spectral camera is set so as to obtain a spectrum similar to that obtained when light incident on the spectral camera is input to any color filter. Thus, regardless of the performance of the spectral camera 10, the color composite image having a high color reproducibility can be generated.

In the image processing apparatus 20 of the present embodiment, the processor 22 further functions as the camera characteristic acquisition unit 222, the filter selection unit 223, and the constant calculation unit 225. The camera characteristic acquisition unit 222 acquires the sensitivity characteristics with respect to the plurality of spectral wavelengths $\Lambda_i$ in the spectral camera 10. The filter selection unit 223 acquires the target spectrum. The constant calculation unit 225 calculates the correction constant $a_i$ so that the sum spectrum matches the target spectrum.

Thus, the image processing apparatus 20 can calculate the correction constants each corresponding to the individual spectral cameras 10 incorporated into the spectral camera system. For example, even when the replacement of the spectral camera 10 is performed, the correction constant corresponding to the spectral camera after replacement can be calculated.

The constant calculation unit 225 of the image processing apparatus 20 of the present embodiment calculates the correction constant $a_i$ that minimize $\Sigma(\{\Sigma a_i S_i(\lambda)\}-F(\lambda))^2$, where $F(\lambda)$ is the target spectrum, $a_i$ is the correction constant with respect to the wavelength $\lambda_i$, and $S_i(\lambda)$ is the sensitivity characteristic when the spectral image data of the spectral wavelength $\Lambda_i$ is imaged by the spectral camera 10.

This makes it possible to appropriately calculate the correction constant capable of reproducing the target spectrum.

Second Embodiment

In the above-described embodiment, the example is illustrated in which the constant calculation unit 225 of the image processing apparatus 20 calculates the correction constant $a_i$ corresponding to the sensitivity characteristic of the spectral camera 10, but the correction constant may be stored in advance in the storage unit 21.

In a second embodiment, an example will be illustrated in which the correction constants corresponding respectively to the plurality of spectral cameras 10 that can be incorporated into the spectral camera system are stored in advance in the storage unit.

Note that, in descriptions below, the configurations previously described are given identical reference signs, and descriptions thereof will be omitted.

Figure 7:
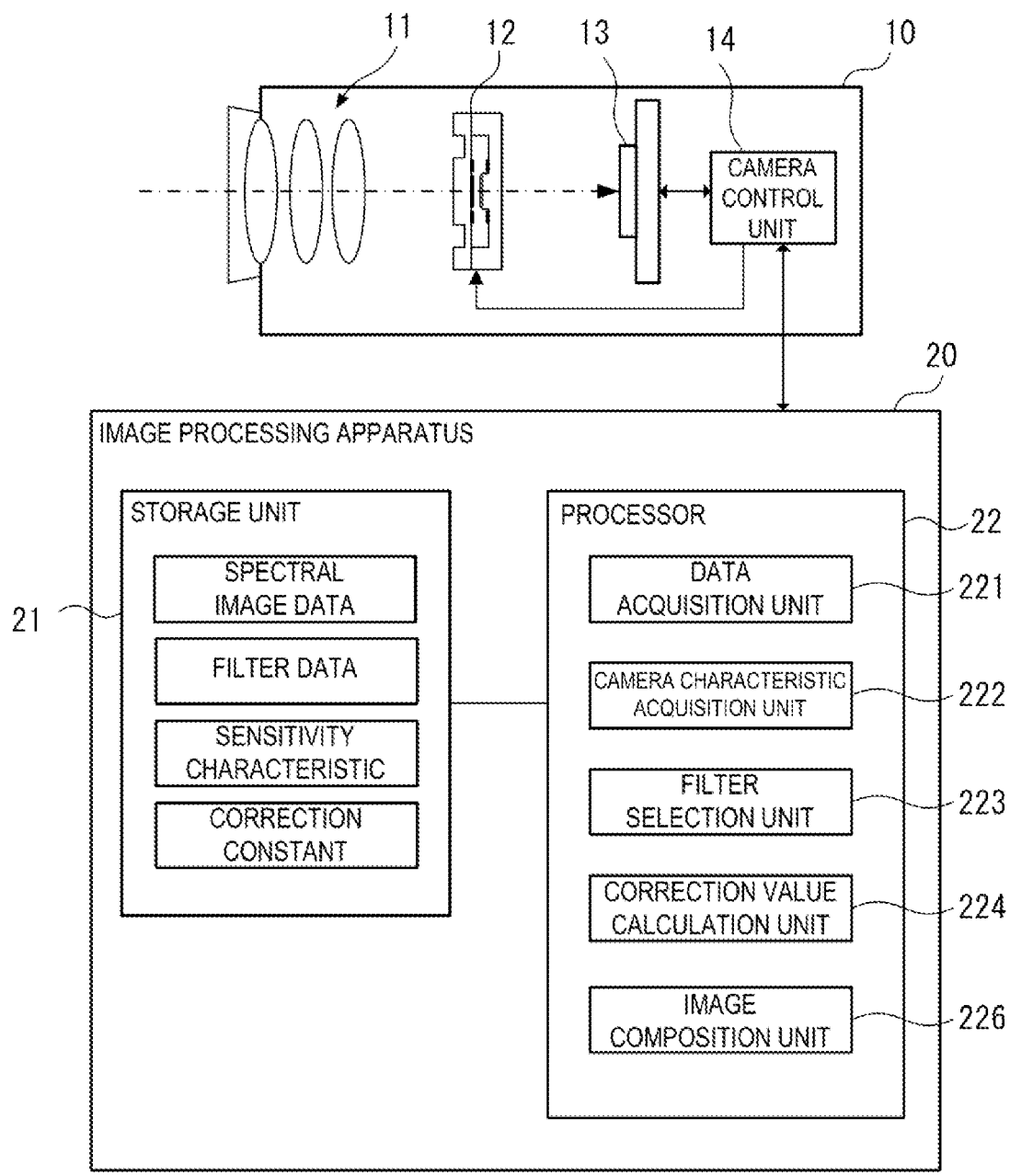
FIG. 7 is a schematic configuration of a spectral camera system according to a second embodiment.

FIG. 7 is a schematic diagram illustrating a schematic configuration of the spectral camera system according to the second embodiment.

The spectral camera system of the present embodiment is configured to include the spectral camera 10 and the image processing apparatus 20 as in the first embodiment. In the present embodiment, the spectral camera 10 is replaceable, and the sensitivity characteristic of the spectral camera 10 available is stored in advance in the storage 21.

Further, the correction constants $a_i$ each corresponding to the sensitivity characteristic of a corresponding one of the spectral cameras 10 are stored in advance in the storage unit 21.

Thus, as illustrated in FIG. 7, in the present embodiment, the processor 22 functions as the data acquisition unit 221, the camera characteristic acquisition unit 222, the filter selection unit 223, the correction value calculation unit 224, and the image composition unit 226. That is, the function of the constant calculation unit 225 for calculating the correction constant is not required.

Although in the present embodiment, the color composite image is generated in substantially the same manner as in the first embodiment, in the present embodiment, after performing steps S11 to S13, the camera characteristic acquisition unit 222 acquires the sensitivity characteristic of the spectral camera 10.

Then, in step S14, the correction value calculation unit 224 reads the correction constant $a_i$ corresponding to the sensitivity characteristic of the spectral camera 10 and corresponding to the color filter selected in step S13 among the correction constants $a_i$ stored in advance in the storage unit 21, and calculates the correction value.

Thereafter, as in the first embodiment, the processes of step S15 and step S16 are performed to generate the color composite image.

Effect of Present Embodiment

In the present embodiment, the same effect as the first embodiment can be exhibited, and the following effect can be further exhibited.

In the spectral camera system of the present embodiment, the correction constant is calculated in advance at the time of factory shipment, and is recorded in the storage unit 21.

Accordingly, it is not necessary to calculate the correction constant, and the configuration of the image processing apparatus 20 can be simplified.

In the spectral camera system of the present embodiment, the storage unit 21 stores the sensitivity characteristics of the plurality of spectral cameras 10 and the correction constant $a_i$ with respect to each sensitivity characteristic. Then, the camera characteristic acquisition unit 222 of the processor 22 acquires the sensitivity characteristic of the spectral camera 10 incorporated into the spectral camera system, and the correction value calculation unit 224 reads out, from the storage unit 21, the correction constant $a_i$ corresponding to the acquired sensitivity characteristic, and calculates the correction value.

This allows the spectral camera 10 to be detachable to the spectral camera system, and when a different spectral camera 10 is mounted the correction value can be easily calculated only by reading the correction constant corresponding to the mounted spectral camera 10 without being required to newly calculate the correction constant.

Additionally, even when the plurality of spectral cameras 10 are connected to the image processing apparatus 20, it is only necessary to read the correction constant $a_i$ corresponding to the spectral camera 10 that has imaged the sectoral image, and the color composite image with the high color reproducibility corresponding to the spectral camera 10 to be used can be generated.

Modification Example

Note that the present disclosure is not limited to each of the embodiments described above, and modifications and improvements within the scope in which the object of the present disclosure can be achieved and configurations obtained by appropriately combining each of the embodiments are included in the present disclosure.

First Modification

In the embodiments described above, the configuration is exemplified in which the spectral camera 10 and the image processing apparatus 20 are included as the spectral camera system, but the spectral camera 10 and the image processing apparatus 20 may be integrally configured. In this case, it is not necessary to store, in the storage unit 21, the sensitivity characteristics of the plurality of spectral cameras 10, and when only the sensitivity characteristic of one spectral camera 10 is recorded, the correction constant corresponding to the one spectral camera 10 can be calculated. In addition, when the correction constant corresponding to the sensitivity characteristic of the spectral camera 10 is calculated and is recorded in the storage unit 21 at the time of factory shipment, the storage unit 21 need not record the sensitivity characteristic.

Second Modification Example

In the embodiment described above, the example is exemplified in which the correction constant $a_i$ for each pixel is set based on the sensitivity characteristic for each pixel of the spectral camera 10, but when the sensitivity characteristic for each pixel is uniform, a common correction constant may be set regardless of the pixel position.

Third Modification Example

In the embodiment described above, the example is exemplified in which the sensitivity characteristic is recorded in the camera memory of the spectral camera 10, but the example is not limited thereto. For example, the sensitivity characteristic may be stored in the storage unit 21, or may be stored in another external device capable of communicating with the spectral camera system.

As another external device, for example, a data server or the like provided by a manufacturer of the spectral camera 10 can be exemplified, and a camera ID such as a manufacturing number that can identify the spectral camera 10 and the sensitivity characteristic of the spectral camera 10 are recorded. The image processing apparatus 20 may transmit the camera ID of the spectral camera 10 incorporated into the spectral camera system to the external device via the Internet or the like, and download the sensitivity characteristic of the corresponding spectral camera 10 from the external device.

Additionally, as the spectral camera system, a sensitivity measurement unit for measuring the sensitivity characteristic of the spectral camera 10 may be incorporated. As the sensitivity measurement unit, for example, a laser light source capable of changing the wavelength is provided, and the wavelength of the laser light is sequentially changed from $\lambda_1$ to $\lambda_K$ to measure the light intensity of the light of each wavelength $\lambda_i$ in each pixel of the imaging element 13. By repeatedly performing this while sequentially changing the spectral wavelength $\Lambda_i$ set at the spectral element 12, the sensitivity characteristic with respect to each spectral wavelength $\Lambda_i$ can be obtained.

SUMMARY OF PRESENT DISCLOSURE

An image processing method according to a first aspect of the present disclosure is an image processing method of converting spectral image data of a plurality of spectral wavelengths imaged by a spectral camera into a color image by using one or more processors, and is configured to cause the one or more processors to execute acquiring, from a storage unit, a plurality of pieces of the spectral image data corresponding respectively to the plurality of spectral wavelengths, calculating a correction value by multiplying a optical spectrum based on a luminance value of each pixel of the plurality of spectral image data by a correction constant set for each wavelength, and calculating a color conversion value by summing the correction values at the same pixel positions in the plurality of spectral image data to generate a color composite image based on the color conversion value of each pixel, wherein when a spectrum obtained by multiplying a sensitivity characteristic spectrum with respect to the spectral wavelength in the spectral camera by the correction constant corresponding to each wavelength is set as a characteristic spectrum, and a spectrum obtained by summing characteristic spectra respectively corresponding to the plurality of spectral wavelengths is set as a sum spectrum, the correction constant is set so that the sum spectrum matches a target spectrum which is a spectrum of any color filter.

In this way, since the correction constant is set so that any color filter is realized based on the sensitivity characteristic of the spectral camera, the color composite image having the high color reproducibility can be generated regardless of the performance of the spectral camera.

The image processing method of the present aspect, is configured to cause the one or more processors to further perform acquiring the sensitivity characteristic spectra with respect to the plurality of spectral wavelengths in the spectral camera, acquiring the target spectrum, and calculating the correction constant corresponding to each wavelength so that the sum spectrum matches the target spectrum.

Thus, the correction constant corresponding to the spectral camera for imaging the spectral image can be calculated. For example, even when the replacement of the spectral camera is performed, the correction constant corresponding to the spectral camera after replacement can be calculated.

In the image processing apparatus of the present aspect, the correction constant $a_i$ is a value that minimizes $\Sigma(\{\Sigma a_i S_i(\lambda)\} - F(\lambda))^2$, where $F(\lambda)$ is the target spectrum, $a_i$ is the correction constant with respect to a wavelength $\lambda_i$, and $S_i(\lambda)$ is a sensitivity characteristic when the spectral image data of a spectral wavelength $\Lambda_i$ is imaged by the spectral camera.

This makes it possible to appropriately calculate
the correction constant capable of reproducing the target spectrum.

A spectral camera system of a second aspect of the present disclosure includes a spectral camera for separating light centered on a predetermined spectral wavelength from incident light and image the separated light and being capable of changing the spectral wavelength to a plurality of wavelengths, a storage unit for storing spectral image data imaged by the spectral camera, a data acquisition unit for acquiring, from the storage unit, a plurality of pieces of the spectral image data corresponding respectively to the plurality of spectral wavelengths, a correction value calculation unit for calculating a correction value by multiplying a optical spectrum based on a luminance value of each pixel of the plurality of spectral image data by a correction constant set for each wavelength, and an image composition unit for calculating a color conversion value by summing the correction values at the same pixel positions in the plurality of spectral image data, and generating a color composite image based on the color conversion value of each pixel, wherein when a spectrum obtained by multiplying a sensitivity characteristic spectrum with respect to the spectral wavelength in the spectral camera by the correction constant corresponding to each wavelength is set as a characteristic spectrum, and a spectrum obtained by summing characteristic spectra respectively corresponding to the plurality of spectral wavelengths is set as a sum spectrum, the correction constant is set so that the sum spectrum matches a target spectrum which is a spectrum of any color filter.

In this way, similarly to the first aspect, since the correction constant is set so that any color filter is realized based on the sensitivity characteristic of the spectral camera, the spectral camera system capable of generating the color composite image having the high color reproducibility can be realized regardless of the performance of the spectral camera.

In the spectral camera system of the present aspect, the correction constant is recorded in advance in the storage unit.

In this case, it is not necessary to calculate the correction constant each time the spectral image is imaged by the spectral camera. Further, the correction constant may be recorded in advance in the storage unit at the time of factory shipment, and in this case, since the correction constant need not be separately calculated in the spectral camera system, the configuration can be simplified.

In the spectral camera system of the present embodiment, the sensitivity characteristic spectra of a plurality of the spectral cameras each having a different sensitivity characteristic spectrum and the correction constant with respect to each sensitivity characteristic spectrum are stored in advance in the storage unit, a camera characteristic acquisition unit for acquiring the sensitivity characteristic spectrum of the spectral camera is further included, and the correction value calculation unit reads out the correction constant corresponding to the acquired sensitivity characteristic spectrum from the storage unit to calculate the correction value.

According to the present aspect, the correction value may be calculated by selecting the correction constant corresponding to the sensitivity characteristic of the spectral camera that has imaged the spectral image from the plurality of correction constants stored in the storage unit, and thus it is not necessary to calculate the correction constant each time the spectral image is imaged by the spectral camera, and when the correction constant is recorded in advance in the storage unit at the time of factory shipment, it is not necessary to calculate the correction constant, and thus the configuration can be simplified.

The spectral camera system of the present embodiment further includes a camera characteristic acquisition unit for acquiring the sensitivity characteristic spectra with respect to the plurality of spectral wavelengths in the spectral camera, and a constant calculation unit for calculating the correction constant corresponding to each wavelength so that the sum spectrum matches the target spectrum.

According to the present aspect, the correction constant corresponding to the spectral camera to be used in the spectral camera system can be calculated. Thus, even when the spectral camera is replaced, the appropriate correction constant can be calculated, and thus the color composite image having the high color reproducibility can be generated.

What is claimed is:

1. An image processing method of converting spectral image data of a plurality of spectral wavelengths imaged by a spectral camera into a color image by using one or more processors comprising:
    causing the one or more processors to execute
    acquiring, from a storage unit, a data cube including optical spectra based on luminance values of the same pixel positions in a plurality of pieces of the spectral image data corresponding respectively to the plurality of spectral wavelengths;
    calculating a correction value by multiplying the optical spectrum of each pixel by a correction constant set for each wavelength; and
    calculating a color conversion value by summing the correction values at the same pixel positions in the plurality of spectral image data to generate a color composite image based on the color conversion value of each pixel, wherein
    when a spectrum obtained by multiplying a sensitivity characteristic spectrum with respect to the spectral wavelength in the spectral camera by the correction constant corresponding to each wavelength is set as a characteristic spectrum, and a spectrum obtained by summing characteristic spectra respectively corresponding to the plurality of spectral wavelengths is set as a sum spectrum, the correction constant is set so that the sum spectrum matches a target spectrum which is a spectrum of any color filter.

2. The image processing method according to claim 1 comprising causing the one or more processors to further perform:
    acquiring the sensitivity characteristic spectra with respect to the plurality of spectral wavelengths in the spectral camera,
    acquiring the target spectrum, and
    calculating the correction constant corresponding to each wavelength so that the sum spectrum matches the target spectrum.

3. The image processing method according to claim 1, wherein
    the correction constant $a_i$ is a value that minimizes $\Sigma(\{\Sigma a_i S_i(\lambda)\}-F(\lambda))^2$, where $F(\lambda)$ is the target spectrum, $a_i$ is the correction constant with respect to a wavelength $\lambda_i$, and $S_i(\lambda)$ is a sensitivity characteristic when the spectral image data of a spectral wavelength $\Lambda_i$ is imaged by the spectral camera.

4. A spectral camera system comprising:
    a spectral camera configured to separate light centered on a predetermined spectral wavelength from incident light and image the separated light and configured to change the spectral wavelength to a plurality of wavelengths;
    a storage unit configured to store spectral image data imaged by the spectral camera;
    a data acquisition unit configured to acquire, from the storage unit, a data cube including optical spectra based on luminance values at the same pixel positions in a plurality of pieces of the spectral image data corresponding respectively to the plurality of spectral wavelengths;
    a correction value calculation unit configured to calculate a correction value by multiplying the optical spectrum of each pixel by a correction constant set for each wavelength; and
    an image composition unit configured to calculate a color conversion value by summing the correction values at the same pixel positions in the plurality of spectral image data, and generate a color composite image based on the color conversion value of each pixel, wherein
    when a spectrum obtained by multiplying a sensitivity characteristic spectrum with respect to the spectral wavelength in the spectral camera by the correction constant corresponding to each wavelength is set as a characteristic spectrum, and a spectrum obtained by summing characteristic spectra respectively corresponding to the plurality of spectral wavelengths is set as a sum spectrum, the correction constant is set so that the sum spectrum matches a target spectrum, the target spectrum being a spectrum of any color filter.

5. The spectral camera system according to claim 4, wherein
    the correction constant is recorded in advance in the storage unit.

6. The spectral camera system according to claim 5, wherein
    the sensitivity characteristic spectra of a plurality of the spectral cameras each having a different sensitivity characteristic spectrum and the correction constant for each sensitivity characteristic spectrum are stored in advance in the storage unit,
    a camera characteristic acquisition unit configured to acquire the sensitivity characteristic spectrum of the spectral camera is further included, and
    the correction value calculation unit reads out the correction constant corresponding to the acquired sensitivity characteristic spectrum from the storage unit to calculate the correction value.

7. The spectral camera system according to claim 4, further comprising:
    a camera characteristic acquisition unit configured to acquire the sensitivity characteristic spectra with respect to the plurality of spectral wavelengths in the spectral camera; and
    a constant calculation unit configured to calculate the correction constant corresponding to each wavelength so that the sum spectrum matches the target spectrum.

* * * * *